United States Patent
Kao et al.

(10) Patent No.: US 9,618,610 B2
(45) Date of Patent: Apr. 11, 2017

(54) TIME OF FLIGHT SYSTEM CAPABLE OF INCREASING MEASUREMENT ACCURACY, SAVING POWER AND/OR INCREASING MOTION DETECTION RATE AND METHOD THEREOF

(75) Inventors: Ming-Tsan Kao, Hsin-Chu (TW); En-Feng Hsu, Hsin-Chu (TW); Chuan-Wei Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 785 days.

(21) Appl. No.: 13/044,563

(22) Filed: Mar. 10, 2011

(65) Prior Publication Data

US 2011/0304842 A1    Dec. 15, 2011

(30) Foreign Application Priority Data

Jun. 15, 2010  (TW) .............. 099119477 A (51) Int. Cl.
*G01S 17/89* (2006.01)
*G01S 7/491* (2006.01)

(52) U.S. Cl.
CPC ............ *G01S 7/4918* (2013.01); *G01S 17/89* (2013.01)

(58) Field of Classification Search
CPC  G01C 3/08; H05B 37/02; G01S 17/06; G01S 7/4918; G01S 17/89
USPC ...................................... 356/5.01
See application file for complete search history.

(56) References Cited

U.S. PATENT DOCUMENTS

| | | | | |
|---|---|---|---|---|
| 6,057,909 A * | 5/2000 | Yahav et al. ................. 356/5.04 |
| 6,860,350 B2 * | 3/2005 | Beuhler et al. ............... 180/167 |
| 6,993,255 B2 * | 1/2006 | Braun et al. ..................... 396/61 |
| 7,079,974 B2 * | 7/2006 | Remillard et al. ............ 702/159 |
| 7,154,591 B2 * | 12/2006 | Muenter et al. ................ 356/10 |
| 2003/0036881 A1 | 2/2003 | Remillard |
| 2008/0018879 A1 | 1/2008 | Kim et al. |
| 2009/0225325 A1 * | 9/2009 | Lopushansky et al. ...... 356/480 |
| 2009/0273770 A1 * | 11/2009 | Bauhahn et al. ............ 356/5.01 |

FOREIGN PATENT DOCUMENTS

| CN | 101109630 A | 1/2008 |
| CN | 101393262 A | 3/2009 |
| TW | 200513365 | 4/2005 |
| TW | 200717160 | 5/2007 |

* cited by examiner

*Primary Examiner* — Luke Ratcliffe
*Assistant Examiner* — Vicente Rodriguez
(74) *Attorney, Agent, or Firm* — Winston Hsu; Scott Margo (57) ABSTRACT

A light source is used for emitting an invisible light toward an object. The object reflects the invisible light and reflected light is formed, and a sensor is used for receiving the reflected light. A processor is coupled to the sensor for recording a time interval of the invisible light traveling from the light source to the object and reflected from the object to the sensor. Then, the processor estimates a measurement distance of the object according to the time interval, and adjusts an emission period of the light source, an exposure period of the sensor, intensity of the invisible light, and/or main sensing range of the sensor according to the measurement distance.

11 Claims, 7 Drawing Sheets

TIME OF FLIGHT SYSTEM CAPABLE OF INCREASING MEASUREMENT ACCURACY, SAVING POWER AND/OR INCREASING MOTION DETECTION RATE AND METHOD THEREOF

CROSS-REFERENCE TO RELATED APPLICATIONS

This application claims priority to Taiwan Patent Application No. 099119477, filed Jun. 15, 2010, and included herein by reference in its entirety.

BACKGROUND OF THE INVENTION

1. Field of the Invention

The present invention is related to a time of flight system and method thereof, and particularly to a time of flight system and related method capable of increasing measurement accuracy, and saving power and/or motion detection rate according to a time interval of detecting light traveling to the object and reflected from the object to the time of flight system.

2. Description of the Prior Art

In the prior art, a time of flight (TOF) system transmits detection light toward an object, and receives reflected light formed by the object reflecting the detection light. The time of flight system estimates a distance between the object and the time of flight system according to a time interval of the invisible light traveling to the object and being reflected by the object back to the time of flight system. However, the time of flight system neither dynamically adjusts distance detecting range with the distance between the object and the time of flight system nor dynamically adjusts an exposure period of a sensor included in the time of flight system, so measurement accuracy of the time of flight system is lower. In addition, the time of flight system also cannot dynamically adjust emission intensity of the light source with the distance between the object and the time of flight system, so the time of flight system cannot save power. In addition to the above drawbacks, the time of flight system also cannot dynamically adjust main sensing range of the sensor with the distance between the object and the time of flight system, so the time of flight system needs to sense a larger range, resulting in lower motion detection rate.

SUMMARY OF THE INVENTION

An embodiment of the present invention provides a method of time of flight capable of increasing measurement accuracy. The method includes transmitting invisible light to detect an object; recording a time interval of the invisible light traveling to the object and reflected from the object to a sensor; and adjusting an emission period of the invisible light and an exposure period of the sensor according to the time interval.

Another embodiment of the present invention provides a time of flight system capable of increasing measurement accuracy. The time of flight system includes a light source, a sensor, and a processor. The light source is used for transmitting invisible light toward an object. The sensor is used for receiving reflected light reflected by the object. And the processor is coupled to the sensor for recording a time interval of the invisible light traveling to the object and reflected from the object to the sensor, and adjusting an emission period of the invisible light and an exposure period of the sensor according to the time interval.

Another embodiment of the present invention provides a method of time of flight capable of saving power. The method includes transmitting invisible light to detect an object; recording a time interval of the invisible light traveling to the object and reflected from the object to a sensor; and adjusting emission intensity of the invisible light according to the time interval.

Another embodiment of the present invention provides a time of flight system capable of saving power. The time of flight system includes a light source, a sensor, and a processor. The light source is used for transmitting invisible light toward an object. The sensor is used for receiving reflected light reflected by the object. The processor is coupled to the sensor for recording a time interval of the invisible light traveling to the object and reflected from the object to the sensor, and adjusting emission intensity of the invisible light according to the time interval.

Another embodiment of the present invention provides a method of time of flight capable of increasing motion detection rate. The method includes transmitting invisible light to detect an object; recording a time interval of the invisible light traveling to the object and reflected from the object to a sensor; and adjusting a main sensing range of the sensor according to the time interval.

Another embodiment of the present invention provides a time of flight system capable of increasing motion detection rate. The time of flight system includes a light source, a sensor, and a processor. The light source is used for transmitting invisible light toward an object. The sensor is used for receiving reflected light reflected by the object. The processor is coupled to the sensor for recording a time interval of the invisible light traveling to the object and reflected from the object to the sensor, and adjusting a main sensing range of the sensor according to the time interval.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
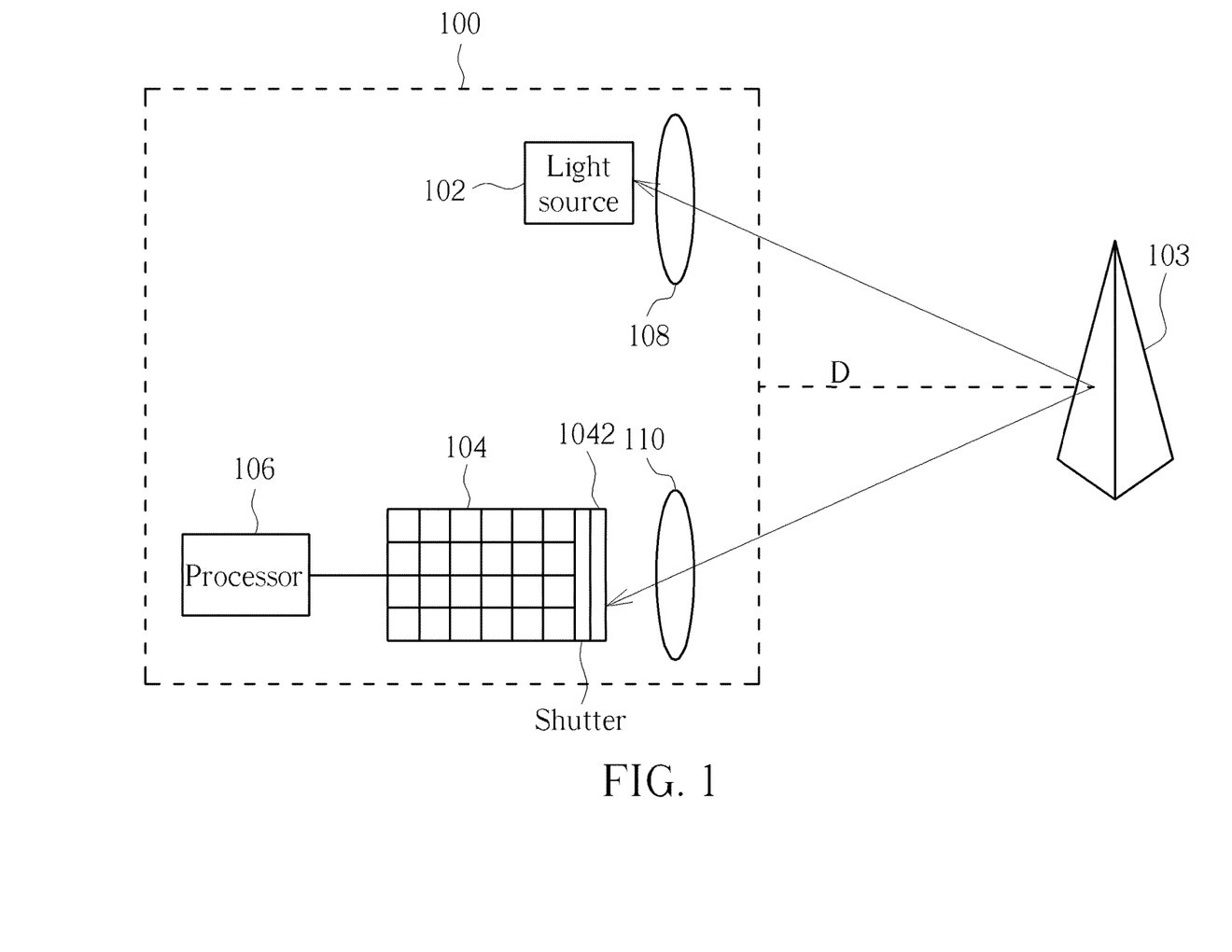
FIG. 1 is a diagram illustrating a time of flight system capable of increasing the measurement accuracy according to an embodiment of the present invention.

Please refer to FIG. 1. FIG. 1 is a diagram illustrating a time of flight system 100 capable of increasing measurement accuracy according to an embodiment of the present invention. The time of flight system 100 includes a light source 102, a sensor 104, and a processor 106. The light source 102 is used for transmitting invisible light to detect an object 103, where the light source 102 is an IR light emitting diode or an IR laser source. The sensor 104 is a sensing array for receiving reflected light reflected by the object 103. When the light source 102 transmits invisible light (infrared light) toward a surface of the object 103, the sensor 104 can determine a shape of the object 103 according to the reflected light. In addition, the sensor 104 further includes an IR filter 1042 for blocking light outside the IR range from entering the sensor 104. The processor 106 is coupled to the sensor 104 for recording a time interval T during which the invisible light travels to the object 103, is reflected by the object 103, and travels to the sensor 104, and adjusting an emission period of the light source 102 and an exposure period of the sensor 104 according to the time interval T.

When the light source 102 is the IR light emitting diode, the time of flight system 100 further includes a first lens 108 coupled between the light source 102 and the object 103 for focusing the infrared light transmitted by the light source 102 onto the surface of the object 103. The focused infrared light is reflected by the surface of the object 103 to form the reflected light. In addition, the time of flight system 100 further includes a second lens 110 coupled between the sensor 104 and the object 103 for focusing the reflected light onto the sensor 104. But, when the light source 102 is an IR laser source, the time of flight system 100 does not need the first lens 108 and the second lens 110 to focus the infrared light.

Figure 2:
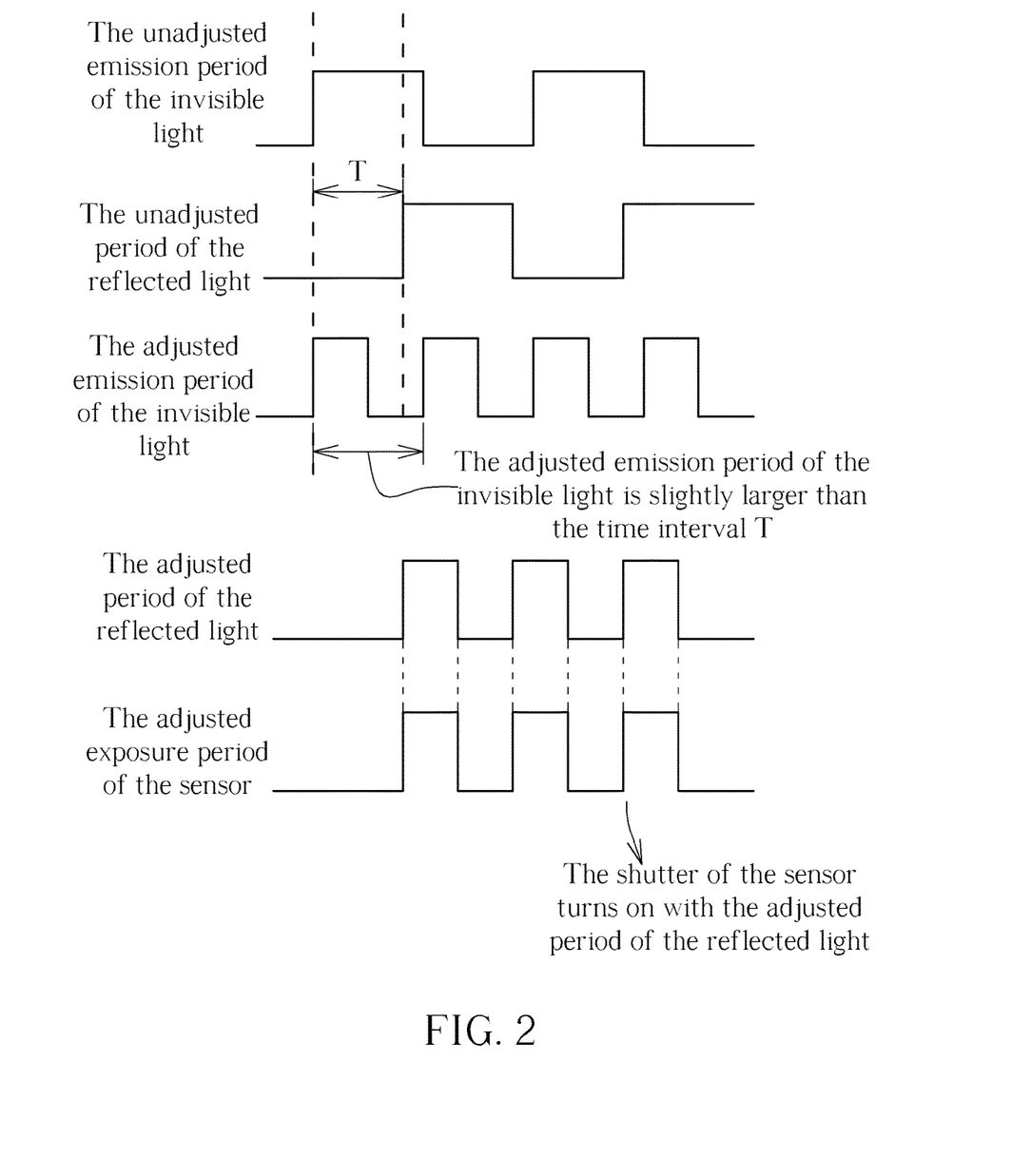
FIG. 2 is a diagram illustrating to record the time interval of the invisible light transmitted from the light source traveling to the object and reflected from the object to the sensor, and adjust the emission period of the light source and the exposure period of the sensor according to the time interval.

Please refer to FIG. 2. FIG. 2 is a diagram illustrating recording of the time interval T during which the invisible light transmitted from the light source 102 travels to the object 103, is reflected from the object 103, and travels to the sensor 104, and adjusting of the emission period of the light source 102 and the exposure period of the sensor 104 according to the time interval T. When the light source 102 starts to transmit the invisible light toward the object 103 consecutively, the sensor 104 is used for sensing the reflected light reflected by the surface of the object 103. Then, the processor 106 records the time interval T during which the invisible light transmitted from the light source 102 travels to the object 103, is reflected from the surface of the object 103, and travels to the sensor 104, and adjusts the emission period of the light source 102 and the exposure period of the sensor 104 according to the time interval T. The adjusted emission period of the light source 102 and the adjusted exposure period of the sensor 104 are slightly longer than the time interval T recorded by the processor 106.

The light source 102 transmits the invisible light toward the object 103 consecutively to detect the object 103, so the processor 106 determines the shape of the object 103 (such as a player face in a game) according to the plurality of reflected light rays sensed by the sensor 104, and determines a distance D between the object 103 and the time of flight system 100 according to the time interval T and the light velocity. In the beginning, the time of flight system 100 detects in a range that is larger than a predetermined distance in front of the sensor 104. For example, if the time of flight system 100 is an interactive game, the time of flight system 100 starts to detect in a range that is larger than 60 cm in front of the sensor 104. But, the present invention is not limited to the interactive game and 60 cm. Any application of the concept of utilizing the time of flight to detect a specific three-dimensional (3D) distance falls within the scope of the present invention. After the emission period of the invisible light is adjusted by the processor 106, the detect range of the time of flight system 100 is limited to a location around the object 103. For example, if the object 103 is 3 meters away from the time of flight system 100, the detect range of the time of flight system 100 is limited to approximately 3 meters. Further, the emission period of the invisible light adjusted by the processor 106 is shortened appropriately (that is, an emission frequency of invisible light goes high), so the processor 106 can obtain more information of the object 103 by the reflected light. Moreover, as shown in FIG. 2, the exposure period of the sensor 104 adjusted by the processor 106 is also shortened appropriately, and the sensor 104 only turns on a shutter when the sensor 104 senses the reflected light, so the sensor 104 can reduce reception of noise from the external environment.

Figure 3:
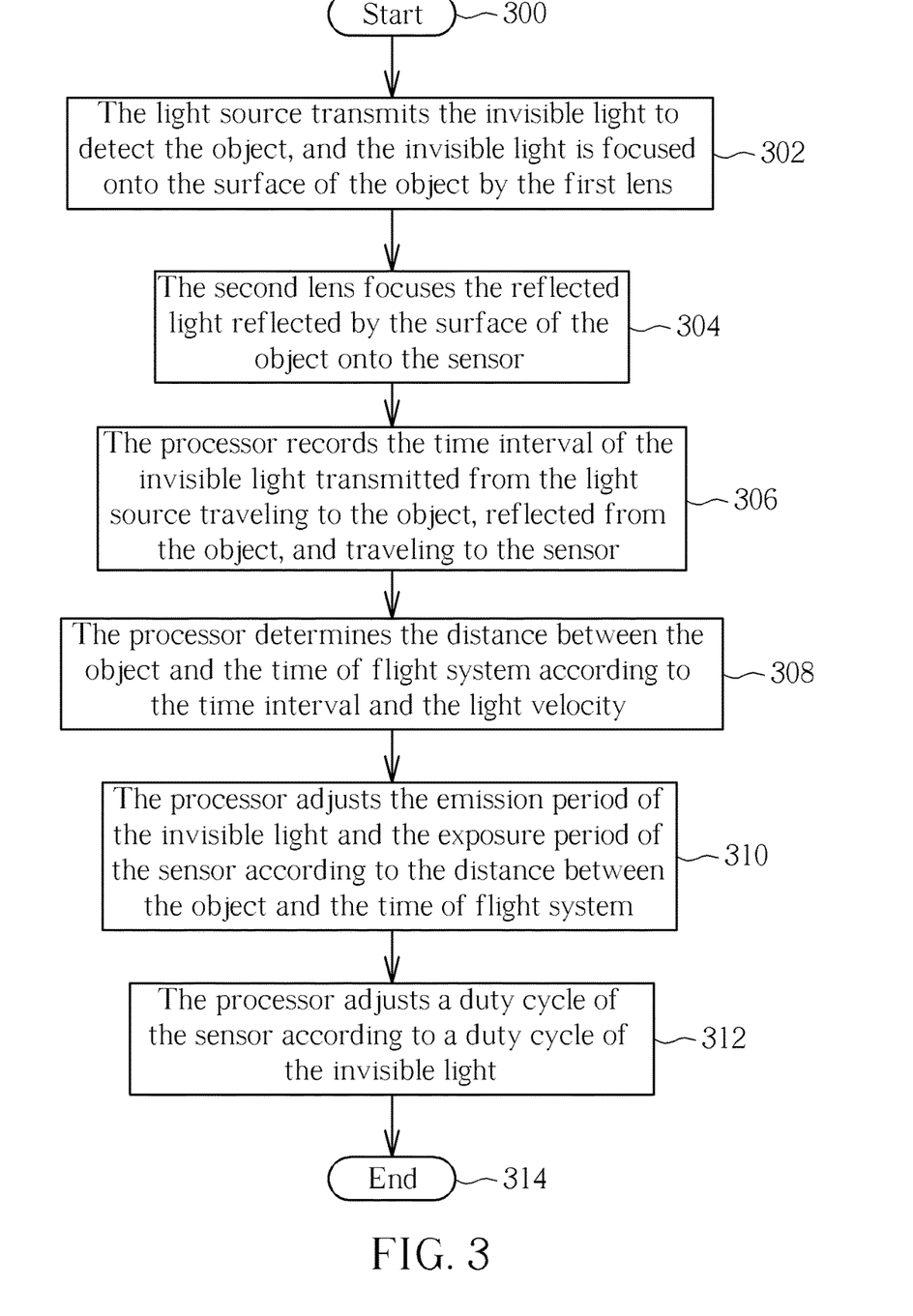
FIG. 3 is a flowchart illustrating a method of time of flight capable of increasing the measurement accuracy according to another embodiment of the present invention.

FIG. 3 is a flowchart illustrating a method of time of flight capable of increasing the measurement accuracy according to another embodiment of the present invention. FIG. 3 utilizes the time of flight system 100 in FIG. 1 to illustrate the method. Detailed steps are as follows:

Step 300: Start.

Step 302: The light source 102 transmits the invisible light to detect the object 103, and the invisible light is focused onto the surface of the object 103 by the first lens 108.

Step 304: The second lens 110 focuses the reflected light reflected by the surface of the object 103 onto the sensor 104.

Step 306: The processor 106 records the time interval T of the invisible light transmitted from the light source 102 traveling to the object 103, reflected from the object 103, and traveling to the sensor 104.

Step 308: The processor 106 determines the distance D between the object 103 and the time of flight system 100 according to the time interval T and the light velocity.

Step 310: The processor 106 adjusts the emission period of the invisible light and the exposure period of the sensor 104 according to the distance D between the object 103 and the time of flight system 100.

Step 312: The processor 106 adjusts a duty cycle of the sensor 104 according to a duty cycle of the invisible light.

Step 314: End.

In Step 304, the sensor 104 includes the IR filter 1042 for blocking light outside the IR range from entering the sensor 104. In Step 310, the processor 106 adjusts the emission period of the invisible light and the exposure period of the sensor 104 according to the distance D. Thus, the emission period of the invisible light adjusted by the processor 106 is shortened appropriately (that is, the emission frequency of invisible light goes high), and the processor 106 can obtain more information of the object 103 by the reflected light. In Step 312 (as shown in FIG. 2), the processor 106 adjusts the duty cycle of the sensor 104 according to the duty cycle of the invisible light, where the duty cycle of the sensor 104 is the same as the duty cycle of the invisible light, and the duty cycle of the invisible light is a percentage of the emission period of the invisible light in which the light source 102 emitting the invisible light is on, and the duty cycle of the sensor 104 is a percentage of the exposure period of the sensor 104 in which the shutter of the sensor 104 is turned on. After the duty cycle of the sensor 104 is adjusted, the sensor 104 only turns on the shutter when the sensor 104 senses the reflected light, so the sensor 104 can reduce reception of the noise from the external environment.

In addition, the embodiment of FIG. 3 can also utilize the IR laser source as a light source, so the embodiment of FIG. 3 utilizing the IR laser source does not need the first lens 108 and the second lens 110 to focus the infrared light.

In another embodiment of the present invention, a time of flight system capable of saving power is illustrated with reference to FIG. 1. The processor 106 of the time of flight system 100 records the time interval T of the invisible light transmitted from the light source 102 traveling to the object 103, being reflected from the surface of the object 103, and traveling to the sensor 104, and determines the distance D between the object 103 and the time of flight system 100 according to the time interval T and the light velocity. Then, the processor 106 adjusts emission intensity of the light source 102 according to the distance D. Because the emission intensity of the light source 102 can be adjusted dynamically with the distance D, the time of flight system 100 can save power.

Figure 4:
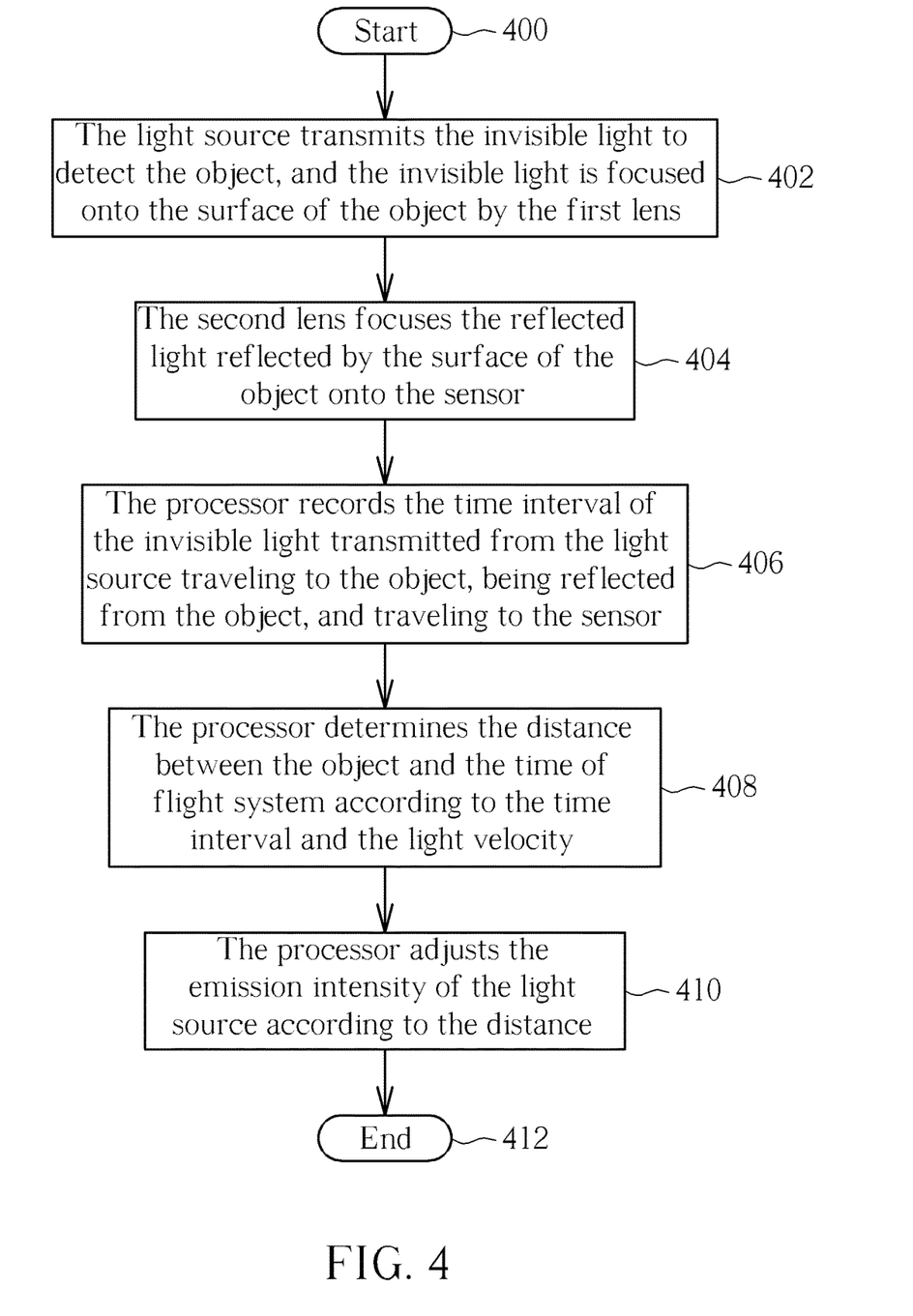
FIG. 4 is a flowchart illustrating a method of time of flight capable of saving power according to another embodiment of the present invention.

FIG. 4 is a flowchart illustrating a method of time of flight capable of saving power according to another embodiment of the present invention. FIG. 4 utilizes the time of flight system 100 in FIG. 1 to illustrate the method. Detailed steps are as follows:

Step 400: Start.

Step 402: The light source 102 transmits the invisible light to detect the object 103, and the invisible light is focused onto the surface of the object 103 by the first lens 108.

Step 404: The second lens 110 focuses the reflected light reflected by the surface of the object 103 onto the sensor 104.

Step 406: The processor 106 records the time interval T of the invisible light transmitted from the light source 102 traveling to the object 103, being reflected from the object 103, and traveling to the sensor 104.

Step 408: The processor 106 determines the distance D between the object 103 and the time of flight system 100 according to the time interval T and the light velocity.

Step 410: The processor 106 adjusts the emission intensity of the light source 102 according to the distance D.

Step 412: End.

In addition, the embodiment of FIG. 4 can also utilize the IR laser source as a light source, so the embodiment of FIG. 4 utilizing the IR laser source does not need the first lens 108 and the second lens 110 to focus the infrared light.

Figure 5:
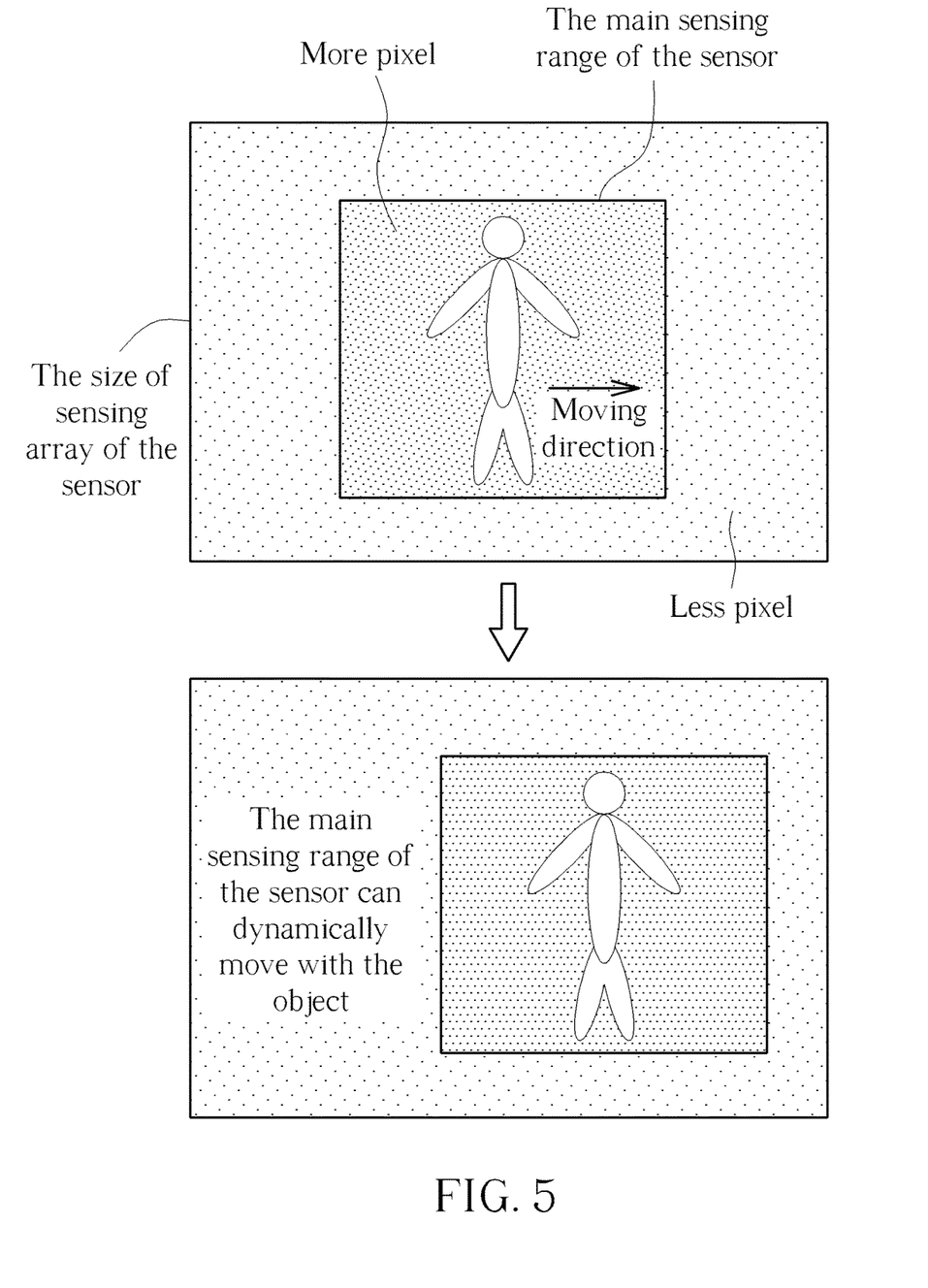
FIG. 5 is a diagram illustrating the processor determining the main sensing range of the sensor according to the size and the motion range of the object.

In another embodiment of the present invention, a time of flight system capable of increasing the motion detection rate is illustrated with reference to FIG. 1. The processor 106 of the time of flight system 100 records the time interval T of the invisible light transmitted from the light source 102 traveling to the object 103, being reflected from the object 103, and traveling to the sensor 104, and determines the distance D according to the time interval T and the light velocity. Please refer to FIG. 5. FIG. 5 is a diagram illustrating the processor 106 determining the main sensing range of the sensor 104 according to the size and the motion range of the object 103. As shown in FIG. 5, after the processor 106 estimates the size of the object 103 and the distance D, the processor 106 adjusts the main sensing range of the sensor 104 according to the size of the object 103 and the motion range of the object 103. Number of pixels sensed by the sensor 104 within the main sensing range is larger than number of pixels sensed by the sensor 104 outside the main sensing range, and the main sensing range of the sensor 104 can move dynamically with the object 103. Because the sensor 104 senses more pixels within the main sensing range, the embodiment of FIG. 5 can reduce the number of pixels outputted by the sensor 104, and increase the motion detection rate.

Figure 6:
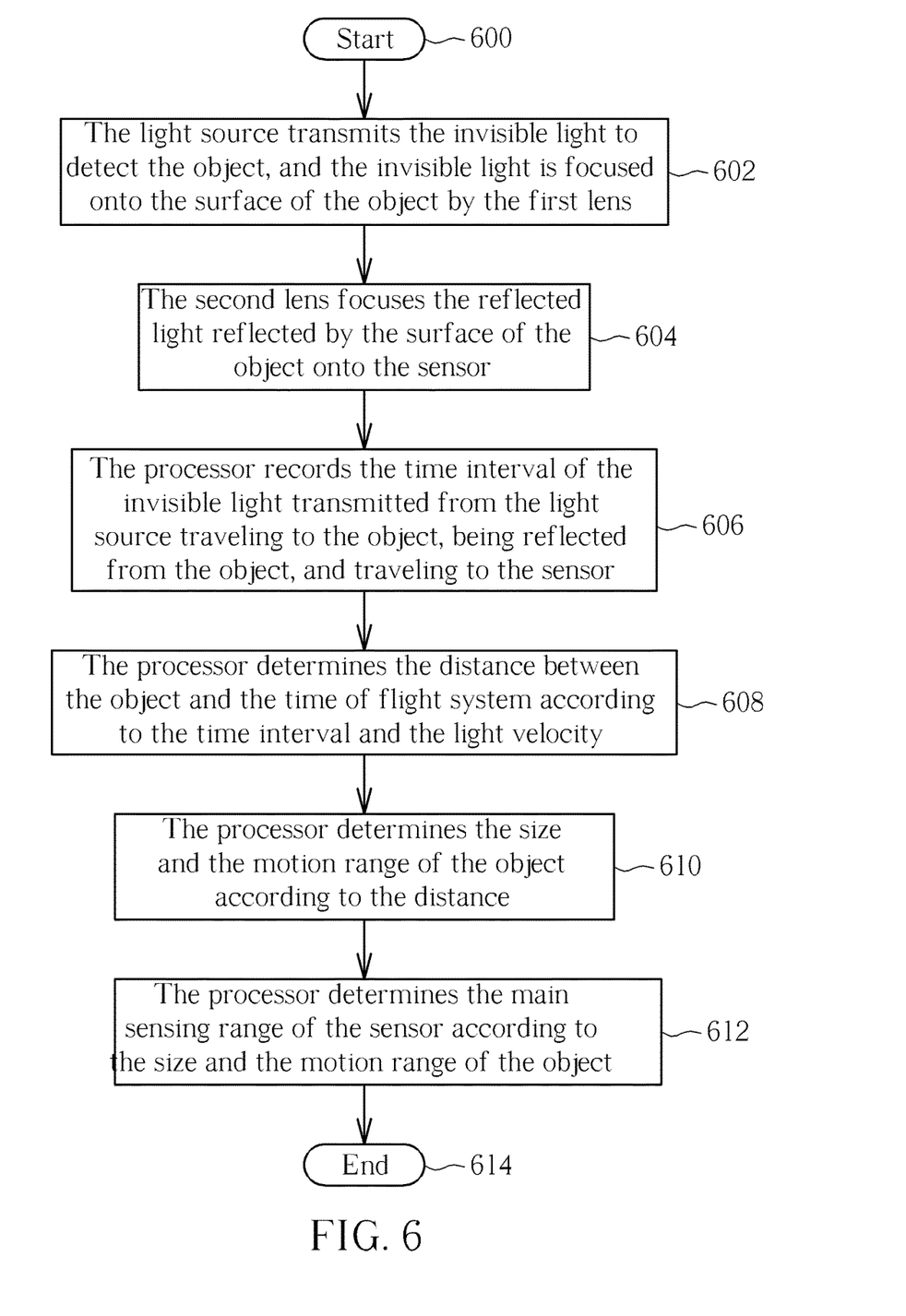
FIG. 6 is a flowchart illustrating a method of time of flight capable of increasing the motion detection rate according to another embodiment of the present invention.

FIG. 6 is a flowchart illustrating a method of time of flight capable of increasing the motion detection rate according to another embodiment of the present invention. FIG. 6 utilizes the time of flight system 100 in FIG. 1 to illustrate the method. Detailed steps are as follows:

Step 600: Start.

Step 602: The light source 102 transmits the invisible light to detect the object 103, and the invisible light is focused onto the surface of the object 103 by the first lens 108.

Step 604: The second lens 110 focuses the reflected light reflected by the surface of the object 103 onto the sensor 104.

Step 606: The processor 106 records the time interval T of the invisible light transmitted from the light source 102 traveling to the object 103, being reflected from the object 103, and traveling to the sensor 104.

Step 608: The processor 106 determines the distance D between the object 103 and the time of flight system 100 according to the time interval T and the light velocity.

Step 610: The processor 106 determines the size and the motion range of the object 103 according to the distance D.

Step 612: The processor 106 determines the main sensing range of the sensor 104 according to the size and the motion range of the object 103.

Step 614: End.

In addition, the embodiment of FIG. 6 can also utilize the IR laser source as a light source, so the embodiment of FIG. 6 utilizing the IR laser source does not need the first lens 108 and the second lens 110 to focus the infrared light.

In another embodiment of the present invention, a time of flight system capable of increasing the measurement accuracy, saving power and/or increasing the motion detection rate is illustrated with reference to FIG. 1. The processor 106 of the time of flight system 100 records the time interval T of the invisible light transmitted from the light source 102 traveling to the object 103, being reflected from the surface of the object 103, and traveling to the sensor 104, and determines the distance D between the object 103 and the time of flight system 100 according to the time interval T and the light velocity. Then, the processor 106 adjusts the emission intensity of the light source 102, the emission period of the invisible light, the exposure period of the sensor 104 and/or the main sensing range of the sensor 104. Thus, the emission period of the invisible light adjusted by the processor 106 is shortened appropriately (that is, the emission frequency of invisible light goes high), and the processor 106 can obtain more information of the object 103 by the reflected light. After the duty cycle of the sensor 104 is adjusted, the sensor 104 only turns on the shutter when the sensor 104 senses the reflected light, so the sensor 104 can reduce reception of the noise from the external environment. Because the emission intensity of the light source 102 can be adjusted dynamically with the distance D, the time of flight system 100 can save power. Further, the sensor 104 senses more pixels within the main sensing range, so the time of flight system 100 can reduce the number of pixels outputted by the sensor 104, save power, and increase the motion detection rate.

Figure 7:
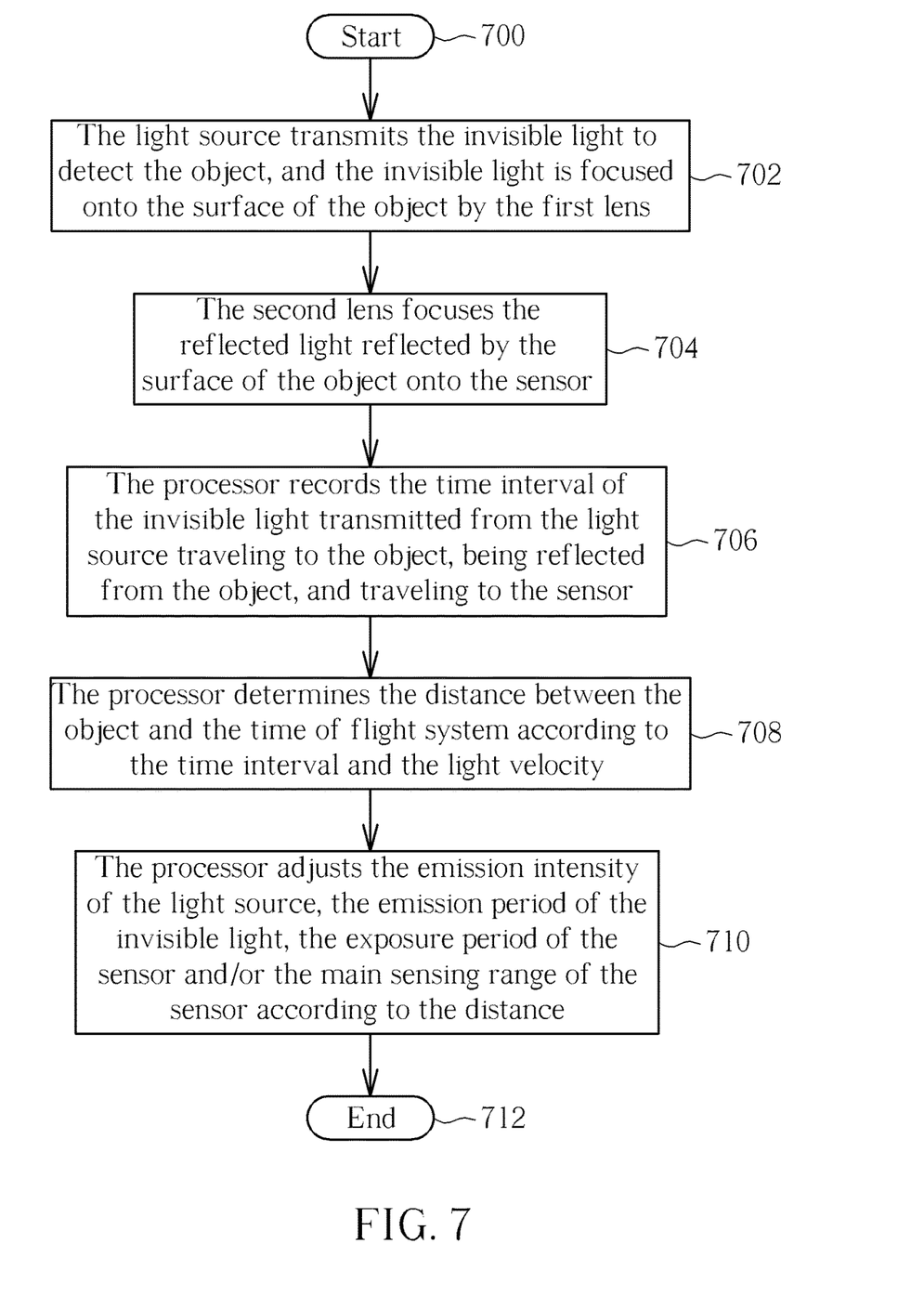
FIG. 7 is a flowchart illustrating a method of time of flight capable of increasing the measurement accuracy, saving power and/or increasing the motion detection rate according to another embodiment of the present invention.

FIG. 7 is a flowchart illustrating a method of time of flight capable of increasing the measurement accuracy, saving power and/or increasing the motion detection rate according to another embodiment of the present invention. FIG. 7 utilizes the time of flight system 100 in FIG. 1 to illustrate the method. Detailed steps are as follows:

Step 700: Start.

Step 702: The light source 102 transmits the invisible light to detect the object 103, and the invisible light is focused onto the surface of the object 103 by the first lens 108.

Step 704: The second lens 110 focuses the reflected light reflected by the surface of the object 103 onto the sensor 104.

Step 706: The processor 106 records the time interval T of the invisible light transmitted from the light source 102 traveling to the object 103, being reflected from the object 103, and traveling to the sensor 104.

Step 708: The processor 106 determines the distance D between the object 103 and the time of flight system 100 according to the time interval T and the light velocity.

Step 710: The processor 106 adjusts the emission intensity of the light source 102, the emission period of the invisible light, the exposure period of the sensor 104 and/or the main sensing range of the sensor 104 according to the distance D.

Step 712: End.

In addition, the embodiment of FIG. 7 also can utilize the IR laser source as a light source, so the embodiment of FIG. 7 utilizing the IR laser source does not need the first lens 108 and the second lens 110 to focus the infrared light.

To sum up, the present invention provides the time of flight system capable of increasing the measurement accuracy, the time of flight system capable of saving power, the time of flight system capable of increasing the motion detection rate, and the time of flight system capable of increasing the measurement accuracy, saving power and/or motion detection rate and method thereof, in which the processor estimates the distance between the object and the time of flight system according to the time interval of the invisible light traveling to the object, being reflected by the object, and traveling to the time of flight system. The present invention provides the time of flight system capable of increasing the measurement accuracy, in which the processor adjusts the emission period of the invisible light and the exposure period of the sensor according to the distance between the object and the time of flight system, so the time of flight system can increase the measurement accuracy and reduce noise received from the external environment. The present invention provides the time of flight system capable of saving power, in which the processor adjusts the emission intensity of the light source according to the distance between the object and the time of flight system, so the time of flight system can save power. The present invention provides the time of flight system capable of increasing the motion detection rate, in which the processor adjusts the main sensing range of the sensor according to the distance between the object and the time of flight system, so the time of flight system can save power and increase the motion detection rate. The present invention provides the time of flight system capable of increasing the measurement accuracy, saving power and/or increasing the motion detection rate, in which the processor adjusts the emission period of the invisible light, the exposure period of the sensor, the emission intensity of the light source and/or the main sensing range of the sensor according to the distance between the object and the time of flight system, so the time of flight system can increase the measurement accuracy, save power, reduce noise from the external environment, and increase the motion detection rate.

Those skilled in the art will readily observe that numerous modifications and alterations of the device and method may be made while retaining the teachings of the invention.

What is claimed is:

1. A method of time of flight capable of increasing motion detection rate, comprising:
    transmitting invisible light to detect an object;
    recording a time interval of the invisible light traveling to the object, being reflected from the object, and traveling to a sensor; and
    dynamically adjusting a main sensing portion of the sensor according to the time interval;
    wherein a size in pixels of the main sensing portion is smaller than a size in pixels of the sensor.

2. The method of claim 1, further comprising:
    dynamically adjusting an emission period of the invisible light, an exposure period of the sensor, and emission intensity of the invisible light according to the time interval.

3. The method of claim 1, further comprising:
    estimating a measurement distance of the object according to the time interval, wherein dynamically adjusting the main sensing portion of the sensor according to the time interval is dynamically adjusting the main sensing portion of the sensor according to the measurement distance of the object.

4. The method of claim 1, wherein dynamically adjusting the main sensing portion of the sensor according to the time interval is dynamically determining a size and motion range of the object according to the time interval, and dynamically determining the main sensing portion of the sensor according to the size and the motion range of the object.

5. The method of claim 1, wherein number of pixels sensed by the sensor within the main sensing portion is greater than number of pixels sensed by the sensor outside the main sensing portion.

6. The method of claim 1, wherein the invisible light is an infrared (IR) light, and the sensor further comprises an IR filter for blocking light outside the IR range from entering the sensor.

7. A time of flight system capable of increasing motion detection rate, comprising:
    a light source for transmitting invisible light toward an object;
    a sensor for receiving reflected light reflected by the object; and
    a processor coupled to the sensor for recording a time interval of the invisible light traveling to the object, being reflected from the object, and traveling to the sensor, and dynamically adjusting a main sensing portion of the sensor according to the time interval;
    wherein a size in pixels of the main sensing portion is smaller than a size in pixels of the sensor.

8. The time of flight system of claim 7, wherein the processor utilizes the time interval to estimate a measurement distance of the object and dynamically adjusts the main sensing portion of the sensor according to the measurement distance of the object.

9. The time of flight system of claim 7, wherein the processor dynamically determines a size and motion range of the object according to the time interval, and dynamically determines the main sensing portion of the sensor according to the size and the motion range of the object.

10. The time of flight system of claim 7, wherein number of pixels sensed by the sensor within the main sensing portion is greater than number of pixels sensed by the sensor outside the main sensing portion.

11. The time of flight system of claim 7, wherein the light source is an IR LED or an IR laser source, and the sensor further comprises an IR filter for blocking light outside the IR range from entering the sensor.

\* \* \* \* \*